United States Patent
Küller et al.

[11] Patent Number: 6,131,483
[45] Date of Patent: Oct. 17, 2000

[54] SELF-ADJUSTING PARKING BRAKE FOR MOTOR VEHICLES

[75] Inventors: Axel Küller, Wuppertal; Sven Bode; Hans-Peter Kalckert, both of Remscheid; Ulf Braker, Schülp, all of Germany

[73] Assignee: ED. Scharächter GmbH, Remscheid, Germany

[21] Appl. No.: 09/227,046

[22] Filed: Jan. 7, 1999

[30] Foreign Application Priority Data

Jan. 11, 1998 [DE] Germany ............... 198 00 603

[51] Int. Cl.⁷ .................................... F16D 65/60
[52] U.S. Cl. ................ 74/535; 74/501.5 R; 74/538; 188/196 BA
[58] Field of Search ............ 74/523, 535, 537, 74/538, 527, 528, 529, 502.2, 512, 501.5 R; 188/196 B, 196 BA; 192/111 A

[56] References Cited

U.S. PATENT DOCUMENTS

| | | | |
|---|---|---|---|
| 4,497,399 | 2/1985 | Kopich | 74/512 |
| 4,819,501 | 4/1989 | Kraus et al. | 74/538 |
| 5,448,928 | 9/1995 | Harger | 74/523 |
| 5,467,666 | 11/1995 | Soucie et al. | 74/512 |
| 5,718,308 | 2/1998 | Chung | 188/196 BA |
| 5,875,689 | 3/1999 | Huebner | 74/535 |

FOREIGN PATENT DOCUMENTS 0 162 749  11/1985  European Pat. Off.

*Primary Examiner*—David Fenstermacher
*Assistant Examiner*—William C. Joyce
*Attorney, Agent, or Firm*—Brown & Wood, LLP

[57] ABSTRACT

A self-adjusting parking brake for a motor vehicle and including a brake lever pivotally supported on a bridge girder, a locking pawl for securing the brake lever on the bridge girder in any arbitrary put-on position of the parking brake, a brake cable driving element likewise supported on the bridge girder and spring-biased in a rotational direction, and an automatically engageable, upon application of the parking brake, formlocking clutch for releasable connecting the brake lever with the brake cable driving element.

9 Claims, 4 Drawing Sheets

SELF-ADJUSTING PARKING BRAKE FOR MOTOR VEHICLES

BACKGROUND OF THE INVENTION

1. Field of the Invention

The present invention relates to a self-adjusting parking brake for a motor vehicle and including a bridge girder provided with toothing, a brake lever pivotally supported on the bridge girder, a locking pawl for securing the brake lever on the bridge girder in any arbitrary put-on position of the parking brake, a brake cable driving element likewise supported on the bridge girder, an adjusting spring for biasing the brake cable driving element in a rotational direction, and a spring-biased clutch for connecting the brake lever with the brake cable driving element.

2. Description of the Prior Art

Conventional self-adjusting parking brakes of the type described above are characterized in that the brake cable, which leads to the wheel brake members, is connected to a disc segment with a circumferential toothing and which forms an adjusting disc. The adjusting disc is supported on a common axle with the brake lever for rotation independently of the brake lever. The adjusting disc is biased in a rotational direction by an adjusting spring formed as a spiral spring. The adjusting disc is connected with the brake lever by a gripping pawl biased by a spring, in particular by a leg spring, in the engagement direction. The gripping pawl engages, upon application of the brake and thereby the pivotal movement of the brake lever from its release position into its engagement position, the toothed adjusting disc, thereby drivingly acting on the brake. The gripping pawl (see, e.g., European Publication EP-0 535 131) is formed as a rocking lever having one of its arms cooperating with the adjusting disc-forming disc segment and another of its arm cooperating with a release abutment fixedly arranged on the bridge girder which is secured to a motor vehicle body. The rocking lever acts so that in a completely release position of the brake lever, the brake lever is disengaged from the adjusting disc, with the adjusting disc being exclusively under the influence of its biasing spring.

These and similar self-adjusting parking brakes are primarily characterized in that the coupling of the brake lever with a cable pulley or a similar driving element for at least one brake cable is effected with a ratchet element, in particular, with a spring-biased pawl. This inevitably generates noise upon actuation of the parking brake on one hand, and on the other results in relatively high manufacturing costs as only relatively small tolerances are allowed.

European Publication EP-0 162 749 discloses an adjusting device which includes a driving element formed as a one-arm lever connected with the brake cable. The one-arm lever is supported on the same carrier as the brake lever and is provided with an axially extending toothing engageable with a complementary toothing provided on a side surface of the brake lever under the action of a pressure spring. The pressure spring is so formed and arranged that is simultaneously imparts a rotational force to the driving element in the brake cable tensioning direction. As a result of the inclination of the opposing toothings of the brake lever and the driving element the rotational force applied to the driving element provides, in the release position of the brake lever, for adjusting of the driving element in case a play has developed in the brake system. The drawback of this adjusting device consists in that a single spring should provide for two different functions and, therefore, cannot be for effecting both functions. Besides, at no time, adjustment of the driving element, which is completely independent of the brake lever, can be achieved.

Accordingly, an object of the invention is to provide a self-adjusting parking brake for a motor vehicle of the above-described type in which an automatic, stepless to a most possible extent adjustment, which is completely independent of the brake lever, is effected after each actuation of the parking brake, without increase of manufacturing and assembly costs.

SUMMARY OF THE INVENTION

This and other objects of the present invention, which will become apparent hereinafter, are achieved by forming the clutch, which connects the brake member with the brake cable driving element as an automatically engageable, upon application of the parking brake, formlocking clutch which releasably connects the brake lever with the brake cable driving element. Providing a clutch, which automatically connects the driving element with the brake lever upon application of the parking brake, opens a possibility of constantly applying a biasing force of an adjusting spring to the driving element. This provides for a constant adjustment of the driving element, thereby permitting to immediately eliminate any play in the brake actuation system with each release of the brake lever. The separation of the brake lever from the driving element can actually be effected in different ways. However, the separation can be realized particularly easy with a separation clutch, which becomes automatically engaged upon actuation of the brake lever. The automatically engageable clutch according to the present invention permits to reliably disconnect a usually unbroken connection between the brake lever and the driving element to provide for a continuous adjustment of the parking brake.

In a particular advantageous embodiment of the present invention, a stepless and particularly noiseless adjustment of the parking brake is effected by providing a formlocking clutch that includes a clutch disc provided with an axially extending toothing, a complementary toothing provided on the brake cable driving element, a clutch spring for separating the clutch disc and the brake cable driving element, and an engaging element.

The axially extending toothing can be formed as a claw arrangement. However, preferably, the toothing has a form of fluting for achieving a most possible noiseless adjustment effect. Preferably, in order to provide a most possible compact structure, it is further contemplated to provide a common bearing member supported on the bridge girder for supporting the brake lever, the clutch disc, and the brake cable driving means for rotation about a common axis. At that, the brake lever and the clutch disc are connected for joint rotation with each other.

In particular, it is contemplated that the bearing member would have a multi-edge, e.g., six-or eight-edge cross-sectional elongate portion on which both the brake lever and the clutch disc would be mounted without a possibility of rotation relative to the bearing member. However, the multi-edge profile insurers simultaneously an easy axial displacement of the clutch disc along the bearing member.

As discussed above, the clutch disc is axially displaceably supported on the bearing member which is formed as a rivet member connected at its end with the driving element, with the clutch spring being formed as a plate spring separating the clutch disc and the driving element.

According to a further advantageous embodiment of the present invention, the engaging element, which is associated with the clutch or forms part thereof, includes a plurality of engaging cams provided a side surface of a bridge girder, and a corresponding number of recesses on a back side of the clutch disc. Each recess has a chamfer forming a run-on ramp for a respective engaging cam.

Preferably, the bridge girder is formed as a stamped sheet material section, with the engaging cams being formed as simple bosses formed by being pressed out.

Together with forming the engaging cams as simple pressed-out bosses in the side surface of the bridge girder, a particularly advantageous embodiment, with small dimensions, is achieved when there are provided three engagement cams uniformly distributed about a rotational axis of the brake lever, with the cams projecting axially from the side surface of the bridge girder, with the recesses being formed as segment-shaped indentations in the back side of the clutch disc.

In order to apply a constant adjusting force to the driving element, according to the invention, the adjusting spring is formed as a spiral spring having one of its ends engaging the brake cable driving element and another of its end supported on the bearing member, preferably by using a sleeve or a similar member.

In the simplest case, the driving element is formed as a one-arm lever, which is rotatably supported on the bearing member, without a possibility of an axial displacement thereto, and is provided on the opposite side of the bridge girder with respect to the adjusting spring formed, as it has already been discussed above, as a spiral spring. The one-arm lever is formed as a flat material section. The brake cable driving element includes a connection member extending through the one-arm lever-forming flat material section and forming, on one hand, a support suitable to be engaged by the loading arm of the spiral-shaped adjusting spring, and on the other hand, a connection for a brake cable.

BRIEF DESCRIPTION OF THE DRAWINGS

The features and objects of the present invention will become more apparent, and the invention itself will be best understood from the following detailed description for the preferred embodiment when read with reference to the accompanying drawings, wherein.

DETAILED DESCRIPTION OF THE PREFERRED EMBODIMENTS

Figure 4:
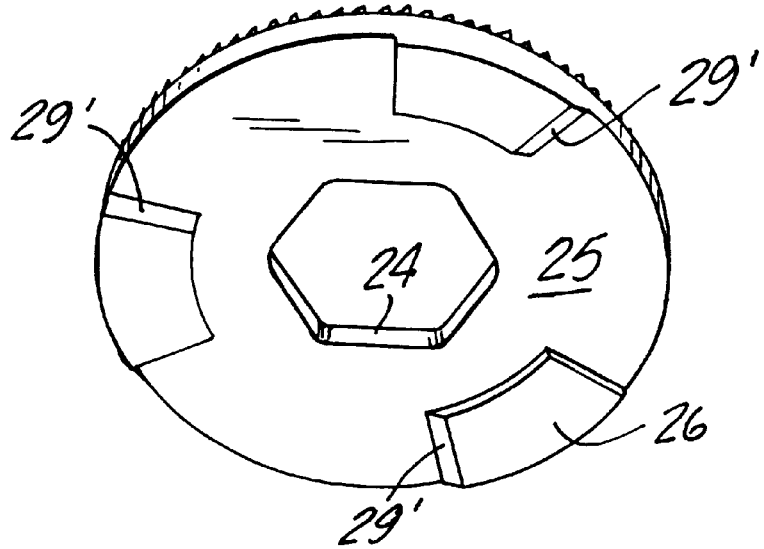
FIG. 4 shows a perspective view of the clutch disc of the clutch shown in FIGS. 1–3, likewise at an increased scale.
Figure 5:
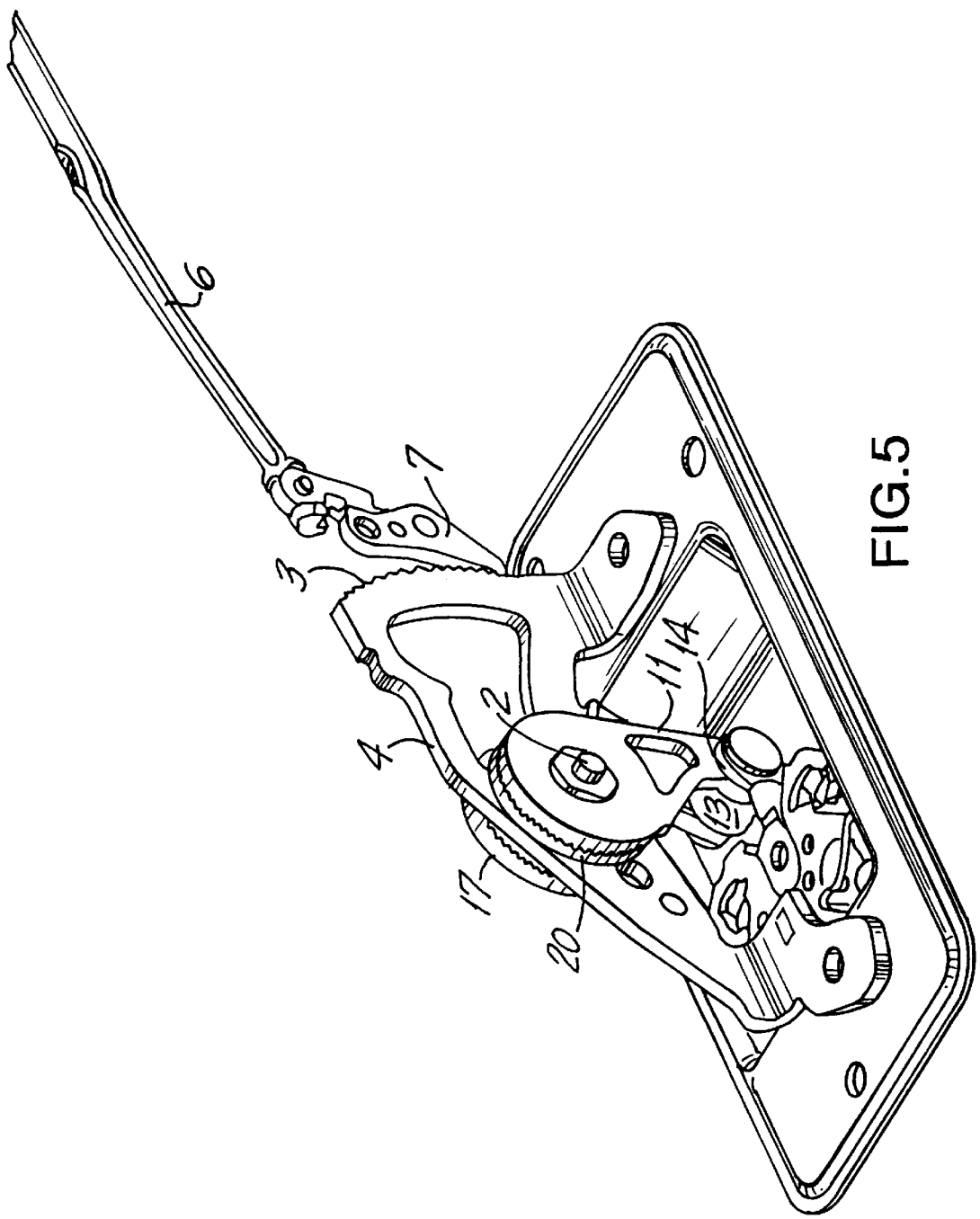
FIG. 5 shows a schematic perspective view of a self-adjusting parking brake in a mounted condition thereof.

A parking brake 1 for a motor vehicle, which is equipped with a self-adjusting device and which is shown in the drawings, includes essentially a brake lever 5, which rotates with an axle 2 and is supported on a bridge girder 4 provided with a radially extending toothing 3. The brake lever 5, which rotates with an axle 2 and is supported on a bridge girder 4, is provided with a radially extending toothing 3. The brake lever 5 in secured on the bridge girder 4 in any arbitrary put-on position of the brake with a locking pawl 7 which, thus, arbitrary locks an actuating rod 6. The bridge girder 4 is screwed with a trough 47 by screw bolts 8. The trough 47 connects the bridge girder 4 with a motor vehicle body (not shown). A one-armed lever 11 is supported, together with the brake lever 5, on the axle 2 which is formed as a bearing member 9. The one-arm lever 11 is rotatable about the axle 2 independently of the brake lever 5. The one-arm lever 11 forms a driving element for a brake cable 10. The one-arm lever 1 has a bore 12 with which it is supported on the bearing member 9 for a free rotation thereabout. On the other hand, the one-arm lever 11 is equipped with a connection member 13 which is received in an opening formed in the one-arm lever 11 which is formed as a section of a flat material. The connection member 13 is riveted in the one-arm lever 11 and has a connection journal 14 for the brake cable 10, on one hand, and a cantilever portion 15, on the other hand, for engagement with a loading arm 16 of an adjusting spring 17. The adjusting spring 17, which permanently acts on the one-arm lever 11, is formed as a flat spiral spring. On the other hand, the adjusting spring 16 has a gripping arm 18 with which it is secured to the axle-forming bearing member 9. The gripping arm 18 is secured to the bearing member 9 with a sleeve (not shown). The brake lever 5 provides for a driving connection of the one-arm lever 11 upon application of the parking brake 1. The driving connection is effected with an automatically engageable formlocking clutch 19. The clutch 19 essentially includes an axially adjustable clutch disc 20, a clutch spring 21, an axially extending toothing 22 provided on the one-arm lever 11 concentric with the bearing bore 12, and a toothing 23, complementary to the toothing 22, provided on the clutch disc 20. The clutch disc 20 has a hexagon opening 24 with which it is mounted on a corresponding hexagon portion 24 of the bearing member 9 without a possibility of rotation relative to the bearing member 9 but with a possibility of axial displacement relative thereto. The brake lever 5 is likewise mounted on the bearing member 9 by hexagon means (not shown) without a possibility of rotation relative thereto, so that each pivotal movement of the brake lever 5 results in a rotational movement of the clutch disc 20. The clutch spring 21, which is formed as a plate spring, retains the formlockingly engageable toothings 22/23 in their disengaged position in the release, not applied, position of the brake lever 5. An engagement arrangement formed of a plurality of engaging cams 29 is associated with the clutch 19. The engaging cams 29 are arranged on the bridge girder 4 along a circle concentrate with respect to a bore 27 for receiving the bearing member 9. The engaging cam 29 cooperates with segment-shaped, axially extending recesses 26 formed on the back side 25 of the clutch disc 20. In the embodiment shown in the drawings, in particular as seen in FIG. 4, there are provided, on the back side 25 of the clutch disc 20, three segment-shaped recesses 26 which are uniformly distributed in the edge area of the back side 25. The engagement arrangement likewise has three engaging bulge-shaped cams 29 which are uniformly distributed along the circle concentric with the bore 27 and which are associated with the respective recesses and are extendable thereinto. The insure a shock-free engagement of the toothings 22 and 23, the segment-shaped recesses 26 are provided, at least on one of their radially extending edges, with a chamfer 29' which forms a run-on ramp for a respective bulge-shaped cam 29.

Figure 1:
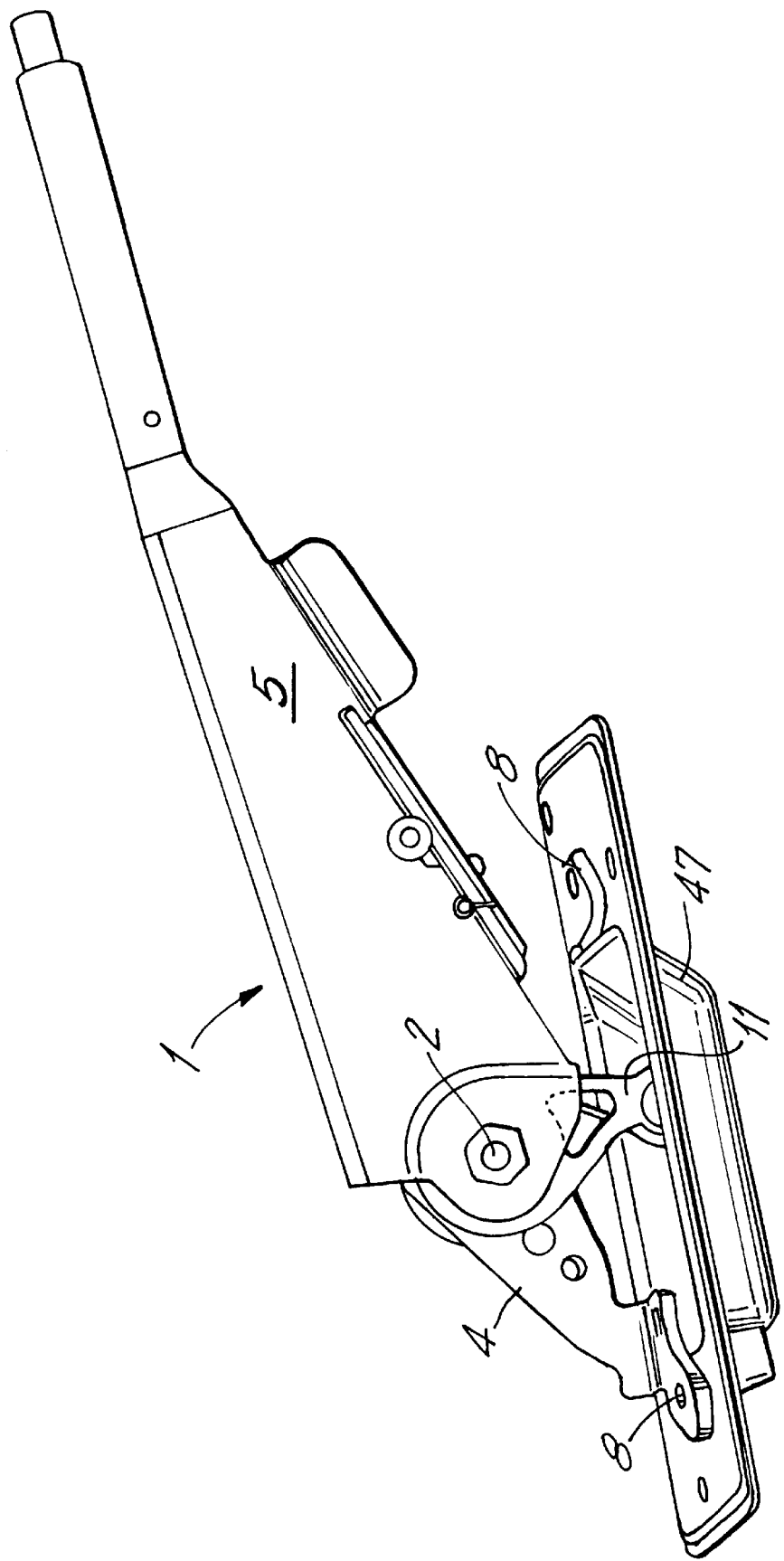
FIG. 1 shows a perspective view of a self-adjusting power brake for a motor vehicle according to the present invention.
Figure 2:
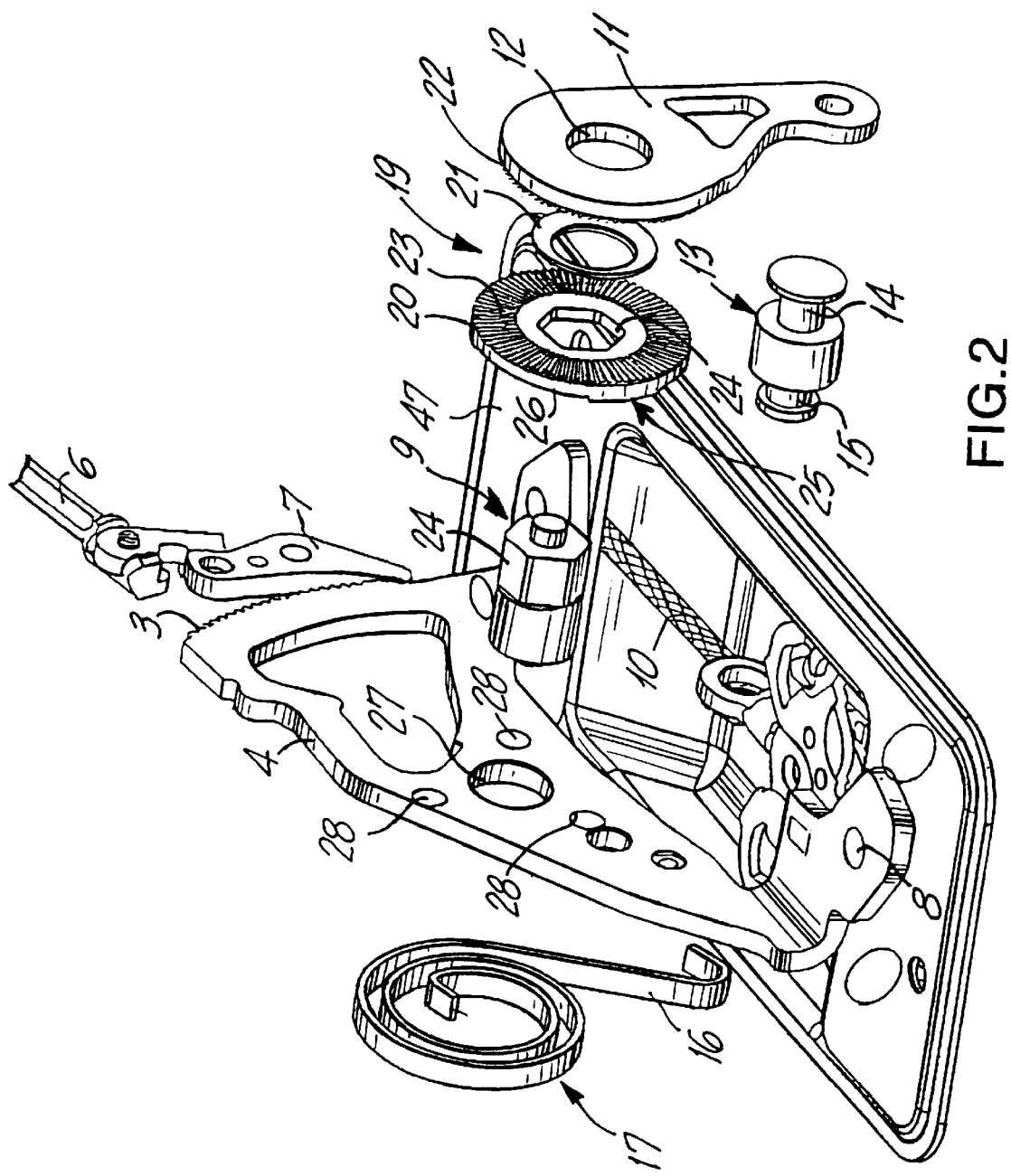
FIG. 2 shows an exploded view of the self-adjusting parking brake shown in FIG. 1 but without the brake lever.
Figure 3:
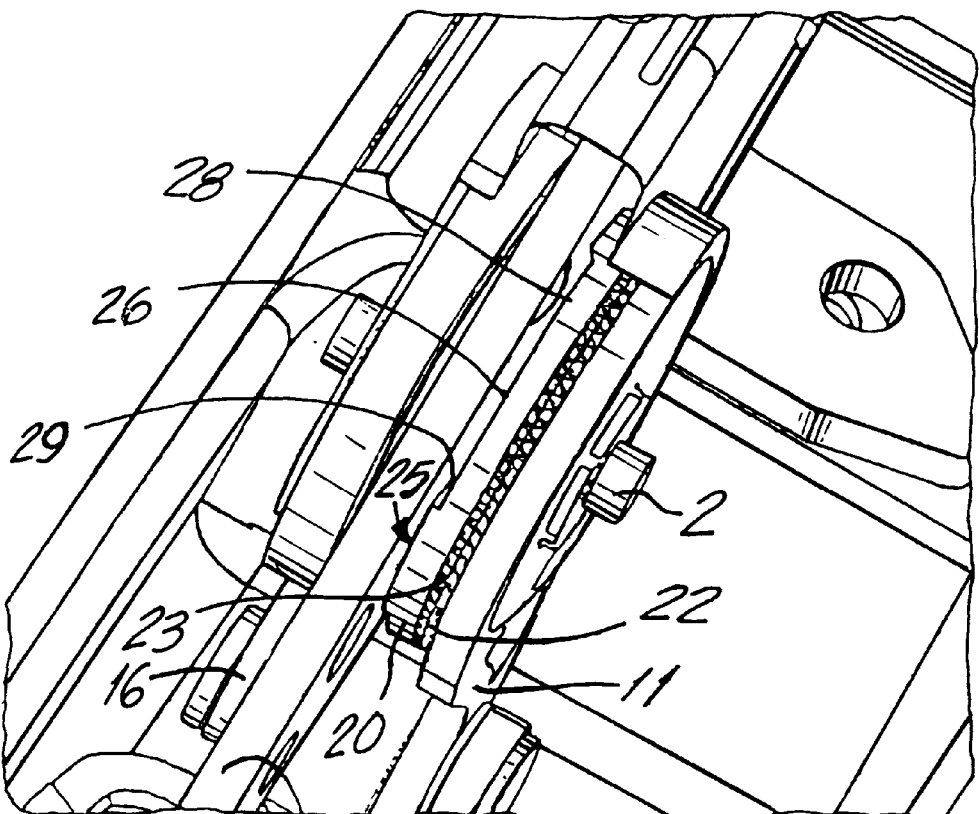
FIG. 3 shows a partial perspective view illustrating a formlocking clutch in the parking brake shown in FIGS. 1 and 2 at an increased scale.

As particularly can be seen in FIG. 3, the bulge-shaped engaging cams 29 engage into the recesses 26, in the release position of the brake lever 5, so that the clutch spring 21 keeps the clutch disc 20 in a spaced relationship relative to the lever 11, with the toothings 22, 23 being disengaged from each other. Upon pivotal movement of the brake lever 5, which is effected in order to put on the parking brake 1, the clutch disc 20 is positively rotated, as described above, whereby the engaging cams 29 slide along the ramps 29' formed in the recessed 26, displacing the clutch disc 20 against the biasing force of the clutch spring 21, whereby the toothings 22 and 23 become formlockingly engaged. Thereby, a rigid connection of the brake lever 5 with the one-arm lever 11 is effected. A reverse process takes place upon the pivotal movement of the brake lever 5 in the opposite direction, resulting in disengagement of the toothings 22 and 23 under the action of the clutch spring 21. This, in turn, results in decoupling of the brake lever 5 and the one-arm lever 11.

The adjusting spring 17 serves for eliminating of a play, which eventually occurs in the brake cable, by displacing the brake cable-driving one-arm lever 11 in a new initial rotational position.

Though the present invention was shown and described with references to the preferred embodiments, various modifications thereof will be apparent to those skilled in the art and, therefor, it is not intended that the invention be limited to the disclosed embodiment or details thereof, and departure can be made therefrom within the spirit and scope of the appended claims.

What is claimed is:

1. A self-adjusting parking brake for a motor vehicle, comprising:

a bridge girder provided with toothing;

a brake lever pivotally supported on the bridge girder;

a locking pawl for securing the brake lever on the bridge girder in any arbitrary put-on position of the parking brake;

brake cable driving means likewise supported on the bridge girder;

an adjusting spring for biasing the brake cable driving means in a rotational direction;

a formlocking clutch means for automatically coupling the brake lever with the brake cable driving means;

wherein the formlocking clutch means comprise a clutch disc provided with an axiallly extending toothing, a complementary toothing provided on the brake cable driving means, a clutch spring for separating the clutch disc and the brake cable driving means, and engaging means for displacing the clutch disc into engagement with the cable driving means.

2. A parking brake as set forth in claim 1, further comprising a common bearing member supported on the bridge girder for supporting the brake lever, the clutch disc, and the brake cable driving means for rotation about a common axis, and wherein the brake lever and the clutch disc are connected for joint rotation with each other.

3. A parking brake according to claim 1, wherein the clutch disc is supported on the bearing member for axial displacement, and the clutch spring is formed as a plate spring arranged between the clutch disc and the brake cable driving means.

4. A parking brake as set forth in claim 1, wherein the engaging means comprises a plurality of engaging cams provided on a side surface of the bridge girder, and a corresponding number of recesses provided on a back side of the clutch disc and having each a chamfer forming a run-on ramp for a respective engaging cam.

5. A parking brake as set forth in claim 4, wherein the plurality of engaging cams comprises three engaging cams uniformly distributed about a rotational axis of the brake lever and projecting axially from the side surface of the bridge girder, and wherein the recesses are formed as segment-shape indentations in the back side of the clutch disc.

6. A parking brake as set forth in claim 2, wherein the adjusting spring is formed as a spiral spring having one of its ends engaging the brake cable driving means and another of its ends supported by the bearing member.

7. A parking brake as set forth in claim 6, wherein the brake cable driving means comprises a one-arm freely rotatable lever, and the spiral-shaped adjusting spring having a radially extending loading arm, at one end, wherein one end of the loading arm engages a free end of the one-arm lever.

8. A parking brake as set forth in claim 1, wherein the adjusting spring and the brake cable driving means are arranged on opposite sides of the bridge girder.

9. A parking brake as set forth in claim 7, wherein the one-arm lever is formed as a flat material section, and wherein the brake cable driving means further comprises a connection member extending through the one-arm lever-forming flat material section and forming, on one hand, a support suitable to be engaged by the loading arm of the spiral-shaped adjusting spring, and on the other hand, a connection for a brake cable.

* * * * *

UNITED STATES PATENT AND TRADEMARK OFFICE
CERTIFICATE OF CORRECTION

PATENT NO.   : 6,131,483
DATED        : October 17, 2000
INVENTOR(S)  : Axel Kuller, et al.

It is certified that error appears in the above-identified patent and that said Letters Patent is hereby corrected as shown below:

Assignee should read: ED. Scharwachter GmbH

Signed and Sealed this

Fifteenth Day of May, 2001

Attest:

NICHOLAS P. GODICI

Attesting Officer    Acting Director of the United States Patent and Trademark Office